(No Model.)
C. HALSTEAD.
COFFEE URN.
No. 355,013. Patented Dec. 28, 1886.
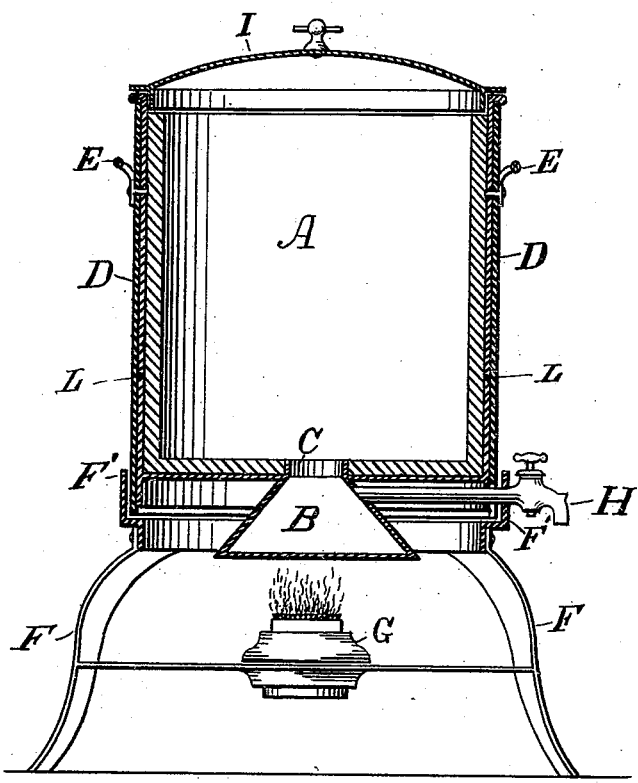
WITNESS:
Richard H. Thomps.
D. S. Quimby Jr.
Charles Halstead
INVENTOR

UNITED STATES PATENT OFFICE.

CHARLES HALSTEAD, OF NEW YORK, N. Y.

COFFEE-URN.

SPECIFICATION forming part of Letters Patent No. 355,013, dated December 28, 1886.

Application filed January 19, 1885. Serial No.153,254. (No model.)

*To all whom it may concern:*

Be it known that I, CHARLES HALSTEAD, a citizen of the United States, and a resident of New York, in the State of New York, have invented a new and Improved Coffee-Urn, of which the following is a specification.

The accompanying drawing represents a vertical section of a coffee-urn embodying my invention.

A is a vessel made of china or earthenware, in which the coffee is made, provided with a dependent metallic chamber, B, connected with the interior through a single opening, C, in the bottom of the vessel A, to enable placing it on the stove or heating the infusion with a lamp, the said vessel B being of a conical form, as shown, having the base thereof flat, or nearly so, and its upper edge flush with the bottom of said vessel A. To facilitate the lifting and carrying of the same, and for ornamental purposes, it is provided with a metallic casing, L, and surrounding plain or decorated enameled iron band D, which form the exterior surface, and with handles E E and cover I. To support the same, F is the lower part or foot, with enlarged upper part or rim, F', to receive the lower part of the vessel A and retain it in place.

G is a lamp arranged in the foot for heating the infusion. In a small family urn the lower part or foot F can be dispensed with and the vessel A placed on the stove for making and keeping the coffee hot.

H is a cock attached to the chamber B, for drawing off the coffee as required.

What I claim as my invention, and desire to secure by Letters Patent, is—

1. A coffee-urn consisting of a china or earthenware vessel, A, having a dependent metallic vessel, B, connected therewith by a single opening, the said vessel B being of a conical form and having its upper edge flush with the bottom of said vessel A, substantially as described.

2. In a coffee-urn, a china or earthenware vessel, A, provided with a dependent metallic vessel, B, which is connected therewith by a single opening, and having its upper edge flush with the bottom of said vessel A, substantially as described.

3. A coffee-urn consisting of the earthenware vessel A, having metallic casing L and band D, with handles E, the foot F, with enlarged upper part or rim, F', adapted as a support for said band D, the dependent metallic chamber B, provided with outlet-pipe having cock H, all of said parts being combined and arranged substantially as described.

4. A coffee-urn having an earthenware upper portion and a dependent metallic chamber, B, of conical form and flat base, having a single opening communicating between said parts, the base of the dependent chamber being larger than the opening in said chamber, all substantially as described.

CHARLES HALSTEAD.

Witnesses:
ROBERT DIETRICH,
D. S. QUIMBY, Jr.